Dec. 26, 1950     R. L. BIDDLE     2,535,887
ROLLER SKATE
Filed Jan. 25, 1946
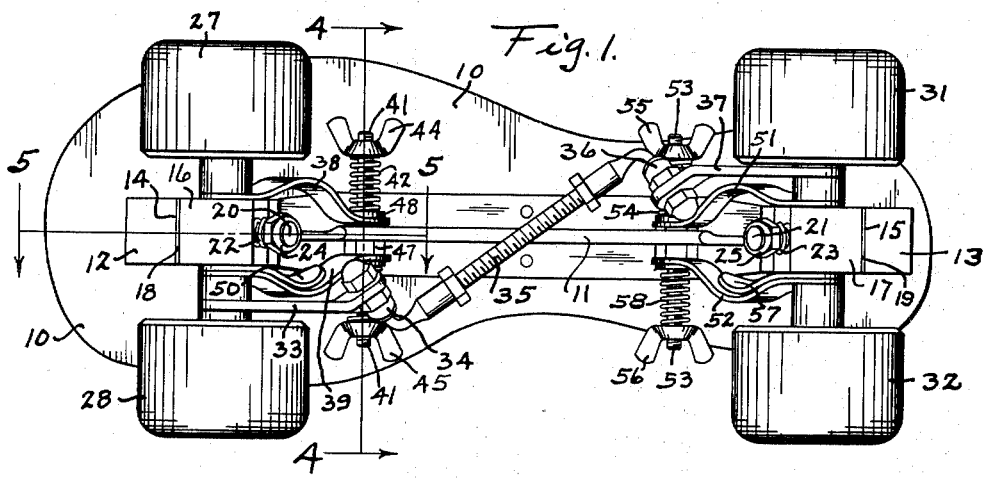
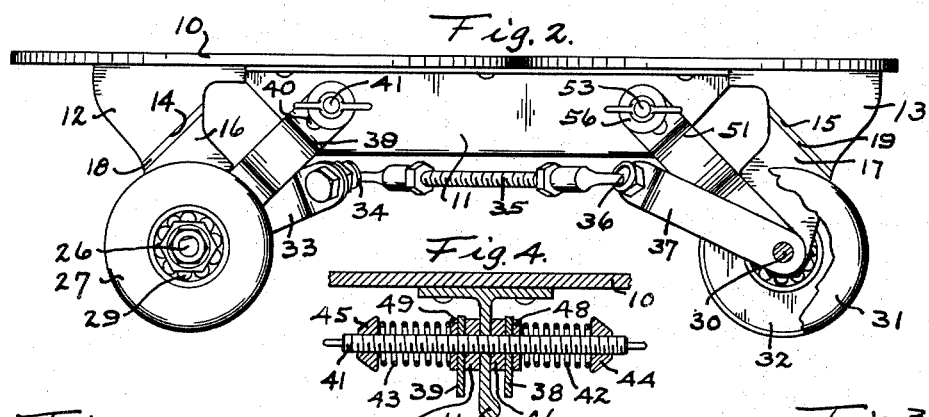
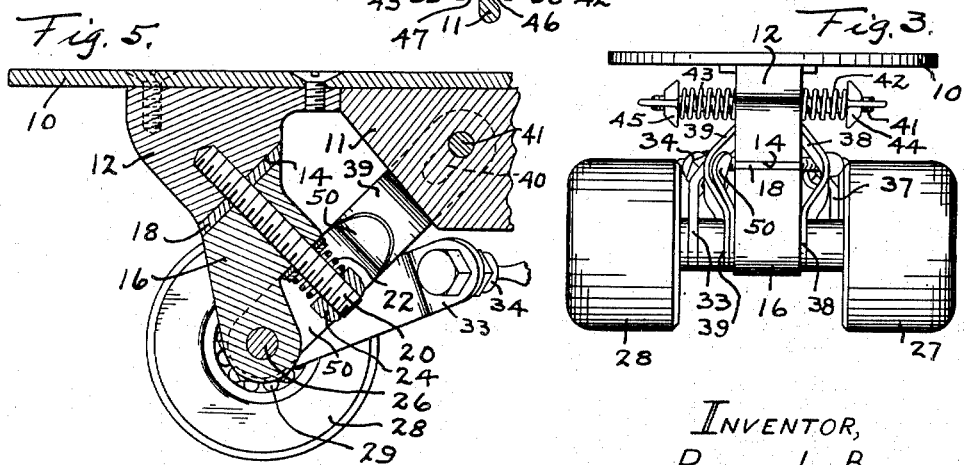
INVENTOR,
RALPH L. BIDDLE,
By Herbert A. Minturn,
ATTORNEY.

Patented Dec. 26, 1950

2,535,887

UNITED STATES PATENT OFFICE 2,535,887

ROLLER SKATE

Ralph L. Biddle, Indianapolis, Ind.

Application January 25, 1946, Serial No. 643,307

4 Claims. (Cl. 280—11.28)

This invention relates to a roller skate wherein front and rear trucks are pivotly mounted to turn one in the opposite direction from the other at the will of the user to permit sharp turns. A primary object of this invention is to provide a structure which will give a full, complete control of both front and rear trucks whereby one is controlled positively in its amount of turning by the turning of the other truck. A further object of the invention is to provide improved means for adequately controlling frictional resistance to turning of the trucks whereby the pressure or weight of the user may be variably applied in accordance with the adjustments controlling the frictional resistance to turning. Other objects and advantages of the invention including the unique combination of the various elements to achieve the above results indicated will become apparent to those skilled in the art in the following description of one particular form of the invention as illustrated in the accompanying drawing in which:

Fig. 1 is a bottom plan view of a skate embodying the invention;

Fig. 2 a view in side elevation;

Fig. 3 a view in front elevation;

Fig. 4, a view in vertical transverse section on a line 4—4 in Fig. 1; and

Fig. 5, a view in central longitudinal section on a line 5—5 in Fig. 1.

Like characters of reference indicate like parts throughout the several views of the drawing.

A foot plate 10 is provided with a central reinforcing under girder 11 secured thereto and underside, and brackets 12 and 13 at the respective ends of the girder 11, each bracket having respectively inclined faces 14 and 15 extending downwardly and outwardly in opposing relation.

Truck heads 16 and 17 respectively bear against these faces 14 and 15 through interposed friction plates 18 and 19. These plates 18 and 19 are slightly resilient and are made out of some material such as fiber or plastic which will permit actual sliding of the truck heads thereover. Studs 20 and 21 respectively are seated in the brackets 12 and 13 to extend normally from their respective faces 14 and 15 through the plates 18 and 19 and on through the respective heads 16 and 17 to extend a sufficient distance therefrom to carry compression springs 22 and 23 under adjusting nuts 24 and 25, as best illustrated in Fig. 5 in reference to the forward truck head 16.

The forward truck head 16 carries in the usual manner a transverse axle 26 on the outer ends of which are suitably mounted the rollers 27 and 28 such as by ball bearings 29. In like manner the rear head 17 carries the transversely aligned axle 30 on the outer ends of which are carried the rollers 31 and 32. On the axle 26 is fixed a lever 33 by its forward end, from which axle 26, the lever 33 extends rearwardly and upwardly to have attached thereto a ball and socket joint 34. A shaft 35 extends from the ball and socket joint 34 diagonally across under the girder 11 to have its other end adjustably secured to a ball and socket joint 36 fixed to the forward end of a lever 37 in turn fixed to the rear axle 30. This lever 37 extends forwardly and upwardly from the axle 30 to position the interconnecting shaft 35 substantially in horizontal alignment. As indicated in Fig. 1, the lever 33 is positioned between the roller 28 and the head 16 on the one side of the skate (right hand side of a left foot skate) and the lever 37 is positioned between the roller 31 and the head 17 on the left hand side of the skate.

On each side of the head 16, leaf springs 38 and 39 are positioned to have the axle 26 go therethrough and are carried upwardly and rearwardly to straddle the forward end of the girder 11 and receive through slots 40 in their upper ends a bolt 41 carried by the girder 11. This bolt 41 extends from both sides of the girder 11, Fig. 4, sufficient distances to carry respectively the compression springs 42 and 43 under wing nuts 44 and 45. Preferably spacers 46 and 47 are interposed between the upper ends of the members 38 and 39 and the respective faces of the girder 11 in order to space apart those ends of the members 38 and 39. Washers 48 and 49 are likewise provided against the outer faces of the members 38 and 39 against which the springs 42 and 43 may respectively bear. On one side of the head 16, herein shown as the inner side, is interposed between the head and the member 38 an auxiliary leaf spring 50 which terminates before reaching the bolt 41. As indicated in the drawing, the leaf springs 38 and 39 have their central portions between the bolt 41 and the axle 26 bowed outwardly one from the other to permit flexing and reduction in effective lengths of the members.

In the same manner the rear axle 30 carries upwardly and forwardly directed bowed leaf springs 51 and 52 through the upper forward ends of which pass a bolt 53 carried by the girder 11. The bolt 53 has compression springs 54 and 53 thereon between the upper ends of the respective springs 51 and 52 and outer adjusting wing nuts 55 and 56. An auxiliary short leaf spring 57 is provided along the spring 52.

By reason of the oblique bearing plates 18 and 19, and the mounting of the heads 16 and 17 thereagainst, turning of those heads around their respective pivot bolts 20 and 21 will cause the axles of the rollers to rock from parallelism with the plate 10 to oblique angles thereto; which is desired in order that extra pressure exerted by the wearer on one side of the skate will tend to produce that turning effect. This turning effect is controlled through the interconnecting shaft 35 and the leverage system above discussed whereby the turning effect is substantially the same but in opposite directions within the limits permitted by the leaf springs 38, 39, and 51, 52 for both truck heads 16 and 17. The amount of pressure required to produce this turning effect is controlled by adjusting the nuts 24 and 25 on the pivot bolts 20 and 21 respectively plus adjustments of the wing nuts 44, 45 and 55, 56 resisting travel longitudinally of the respective leaf springs frictionally (by reason of their slotted upper ends) by side pressure thereagainst whereby increased friction on the upper ends of those leaf springs will tend to require bowing of those leaf springs before the turning effect is secured. It is to be noted that all four of the rollers 27, 28, 31, and 32 have their outer circumferential edges rounded in order to facilitate the rocking of the trucks under control of the skate wearer. In other words, the wearer may rock his foot to rock the plate 10 to bear down on the one side to cause the opposite rollers to tend to seat on the floor and thus hold the truck heads in the turned positions, whereby the wearer may execute a very short radius of turn. The thickness and number of the leaves of the springs 38, 39, 51, 52, and 57 may be varied depending upon the weight of the skates—stiffer springs being desirable for heavier weights.

While I have herein shown and described my invention in the one particular form, it is obvious that structural variations may be had without departing from the spirit of the invention, and I therefore do not desire to be limited to that precise form beyond the limitations as may be imposed by the following claims.

I claim:

1. In a roller skate, a foot plate; fore and aft roller trucks rockably mounted under said plate on oppositely inclined axes; a lever extending from each truck toward the other truck, the lever of one being on an opposite side of the rotation axis of the other; and a shaft rockably interconnecting said levers, whereby turning of one truck induces opposite turning of the other truck; and means selectively yieldingly resisting said turning; said means comprising a bowed leaf spring carried by each of said trucks to extend approximately normal to their axes of rotation toward the underside of said plate between said trucks, means carried by said plate separately receiving the upper end of each of said springs, and means selectively yieldingly securing said upper spring ends to their respective plate carried means.

2. In a roller skate, a foot plate, a bracket mounted under each end portion of the plate and having a downwardly and outwardly inclined face; a pair of trucks, each having a head bearing on each of said bracket faces, an axle transversely positioned, and a roller on each end portion of the axles; a king pin extending normally from each of said faces to engage the respective truck head for relative rotation between the head and said face; means selectively yieldingly retaining each of said heads against said rotation; a lever carried by each of said trucks to extend inwardly under said plate, one toward the other; a shaft interconnecting inner end portions of said levers; one of said levers being on one side of the king pin of one truck head and the other lever on the opposite side of the other pin; a leaf spring carried by each truck to extend upwardly toward said plate between said trucks; and a member carried by said plate adjacent each of said brackets, the upper end of each of said leaf springs being carried by said member; said leaf springs being bowed between the trucks and said member.

3. In a roller skate, a foot plate, a bracket mounted under each end portion of the plate and having a downwardly and outwardly inclined face; a pair of trucks, each having a head bearing on each of said bracket faces, an axle transversely positioned, and a roller on each end portion of the axles; a king pin extending normally from each of said faces to engage the respective truck head for relation rotation between the head and said face; means selectively yieldingly retaining each of said heads against said rotation; a lever carried by each of said trucks to extend inwardly under said plate, one toward the other; a shaft interconnecting inner end portions of said levers; one of said levers being on one side of the king pin of one truck head and the other lever on the opposite side of the other pin; a leaf spring carried by each truck to extend upwardly toward said plate between said trucks; and a member carried by said plate adjacent each of said brackets, the upper end of each of said leaf springs being carried by said member; said leaf springs being bowed between the trucks and said member; said leaf springs being mounted on common sides of said trucks; a second set of bowed leaf springs, one carried by each truck on sides opposite the first leaf springs, said second set of springs also having their ends carried by said member; a bolt through said member and the ends of the leaf springs of one truck; a second bolt through said member and the ends of the springs of the other truck; all of said spring upper ends being slotted to travel across said bolt; and selectively yielding means on each bolt for resisting said spring travel.

4. A roller skate comprising a foot plate; fore and aft roller trucks rockably mounted under said plate on axes inclined one toward the other from opposite end portions of the foot plate; a lever extending from each truck one toward the other, the lever of one being on an opposite side of the rotation axis from the other; a shaft rockably interconnecting said levers, whereby turning of one truck induces opposite turning of the other truck; and means yieldingly resisting said turning comprising a leaf spring fixed respectively to each of said trucks by one end portion, a leaf spring mounting on said foot plate between said trucks, and said springs being attached to said mounting.

RALPH L. BIDDLE.

REFERENCES CITED

The following references are of record in the file of this patent:

UNITED STATES PATENTS

| Number | Name | Date |
|---|---|---|
| 177,567 | Saladee | May 16, 1876 |
| 293,299 | Barney | Feb. 12, 1884 |
| 328,510 | Owsley et al. | Oct. 20, 1885 |
| 1,034,625 | Kohler et al. | Aug. 6, 1912 |
| 2,162,128 | Shoemaker | June 13, 1939 |
| 2,430,533 | Reich | Nov. 1, 1947 |